(12) United States Patent
Laurens et al.

(10) Patent No.: US 8,076,399 B2
(45) Date of Patent: Dec. 13, 2011

(54) BINDER COMPOSITION AND ASPHALT MIXTURE

(75) Inventors: Claire Laurens, Petit Couronne (FR); Hechem Nadjar, Colombes Cedex (FR); Anne Claire Rebuffatti, Petit Couronne (FR); Catherine Rodrigues, Petit Couronne (FR); Kathy Wang, Petit Couronne (FR); Chantal Soubigou, Petit Couronne (FR)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/745,570

(22) PCT Filed: Dec. 5, 2008

(86) PCT No.: PCT/EP2008/066861
§ 371 (c)(1),
(2), (4) Date: Oct. 5, 2010

(87) PCT Pub. No.: WO2009/071653
PCT Pub. Date: Jun. 11, 2009

(65) Prior Publication Data
US 2011/0015312 A1    Jan. 20, 2011

(30) Foreign Application Priority Data

Dec. 7, 2007 (EP) .................................. 07291474

(51) Int. Cl.
*C08L 93/04* (2006.01)

(52) U.S. Cl. .......... 524/77; 524/272; 524/312; 525/54.4

(58) Field of Classification Search ............... 524/60, 524/61, 312, 272, 77; 525/54.4
See application file for complete search history.

(56) References Cited

U.S. PATENT DOCUMENTS

| | | | |
|---|---|---|---|
| 3,985,694 A | 10/1976 | Petrucco et al. | 260/28.5 |
| 4,767,813 A * | 8/1988 | Evitt | 524/271 |
| 6,380,320 B1 | 4/2002 | Wong | 525/285 |
| 7,501,468 B2 * | 3/2009 | Stumphauzer et al. | 524/474 |
| 2006/0183823 A1 * | 8/2006 | Saidman | 524/47 |

FOREIGN PATENT DOCUMENTS

JP          60-115653    *    6/1965

* cited by examiner

*Primary Examiner* — Peter Szekely
(74) *Attorney, Agent, or Firm* — Charles W. Stewart

(57) ABSTRACT

A binder composition and asphalt mixture that are suitably used to prepare asphalt pavements are disclosed. The binder composition comprises a resin of vegetable origin, an oil of vegetable origin and a polymer, and the polymer comprises functional groups chosen from carboxylic acid anhydride, carboxylic acid and epoxide groups.

12 Claims, No Drawings

BINDER COMPOSITION AND ASPHALT MIXTURE

The present application claims priority from European Patent Application 07291474.0 filed 7 Dec. 2007.

FIELD OF THE INVENTION

The invention relates to a binder composition and an asphalt mixture that are suitably used to prepare asphalt pavements.

BACKGROUND OF THE INVENTION

Road surfaces (known as pavements) are routinely constructed from asphalt mixture, which is a composite of binder and aggregate. For most pavements, the binder is bitumen, a viscous liquid or a solid consisting essentially of hydrocarbons and their derivatives. However, in recent years synthetic binders have also been used. Synthetic binders, such as Shell's Mexphalte C® possess similar rheological and mechanical properties to the bituminous binders typically used in road applications. The synthetic binders are typically clear, so they are readily pigmented and can be used to obtain coloured asphalt mixture. The synthetic binders can also be used in other applications, such as roofing, waterproofing or sealing applications, e.g. the synthetic binders can be used to seal the gaps between paving stones.

EP 179 510 discloses synthetic binders comprising resin, oil and, optionally, polymer. The resin is a petroleum resin or coumarone-indene resin that contains carboxylic acid, carboxylic acid anhydride or hydroxyl groups. The oil is preferably a mineral lubricating oil extract such as Bright-Stock extract, and the polymer may be a synthetic rubber such as styrene-butadiene-styrene. The use of modified resins containing carboxylic acid, carboxylic anhydride or hydroxyl groups improves the ductility and adhesion properties of the binder compositions.

EP 1 466 878 discloses synthetic binders comprising resin and oil, but not comprising polymer. The resin and oil are renewable raw materials of vegetable origin.

The present inventors have sought to provide an alternative synthetic binder composition. Preferably the binder has improved adhesion properties and preferably the binder uses renewable raw materials.

SUMMARY OF THE INVENTION

Accordingly, the present invention provides a binder composition comprising a resin of vegetable origin, an oil of vegetable origin and a polymer, characterised in that the polymer comprises functional groups chosen from carboxylic acid anhydride, carboxylic acid and epoxide groups.

The present inventors have found that using such a functionalised polymer in a binder composition improves the adhesion properties of the binder composition.

In a further aspect, the present invention provides an asphalt mixture comprising the binder composition according to the invention and aggregate.

The binder composition and asphalt mixture of the invention are suitably used in processes for preparing road surfaces, but may also be used in other applications, e.g. in roofing, waterproofing or sealing applications.

DETAILED DESCRIPTION OF THE INVENTION

Resins of vegetable origin are a renewable resource and are typically clear, so can be used to prepare a clear binder. The resin may be used as such, or may have been modified chemically. The term "resin of vegetable origin" in the present description is used to describe both resins as such ("natural resins") and resins that have been modified chemically ("modified resins"). The term "resin of vegetable origin" does not include synthetic resins derived from petroleum feedstocks such as polyester resins and epoxy resins. Preferably the resin is chosen from the group consisting of rosin esters, natural rosins, metal resinates, copal resins, accroid and dammar. More preferably the resin is a rosin ester. Most preferably the resin is the pentaerythitol ester of rosin.

The resin preferably has a softening point, as measured according to ISO 4625, of greater than 40° C. and less than 200° C., more preferably of greater than 80° C. and less than 180° C.

The oil of vegetable origin is an oil derived from a plant, that may or may not have been further modified by chemical or physical processes. Preferably the oil is derived from the plant and has not been subjected to further chemical modification. Vegetable oils are a renewable resource and are typically very clear, particularly if a refined vegetable oil is used, so can be used to prepare a clear binder. Vegetable oils can usually be transported cold (typically vegetable oils flow at ambient temperatures) and the product quality of vegetable oils is generally consistent. Preferably the oil is chosen from the group consisting of rapeseed oil, palm oil, tall oil, soybean oil, sunflower oil, peanut oil, cottonseed oil, olive oil, corn oil, linseed oil, rice bran oil, safflower oil, sesame oil, flax oil, ground nut oil, coconut oil and palm kernel oil. More preferably the oil is chosen from rapeseed oil, palm oil and tall oil. Most preferably the oil is rapeseed oil. Rapeseed oil is very clear, and has no smell. The vegetable oil may be used in a raw, used or refined form, and may have been modified chemically, e.g. by esterification.

The oil preferably has a viscosity, as measured according to EN12595 at 100° C., of greater than 2 cSt ($2\times10^{-6}$ m$^2$/s) and less than 200 cSt ($2\times10^{-4}$ m$^2$/s), more preferably of greater than 5 cSt ($5\times10^{-6}$ m$^2$/s) and less than 100 cSt ($1\times10^{-4}$ m$^2$/s).

The preferred amounts of resin and oil in the binder vary with the properties (particularly the viscosity and the softening point) of the resin and the oil. It is preferred to maximise the amount of oil because typically this is the least expensive component in the binder. However, if the amount of oil is too high (and the amount of resin is too low) the binder composition is likely to be too soft and insufficiently viscous. If the amount of resin is too high (and the amount of oil is too low), the cost of the binder composition is likely to be high and the binder composition is likely to be too hard and too viscous.

The amount of resin in the binder is preferably greater than 10 wt % (based upon the weight of the binder), more preferably greater than 20 wt %, most preferably greater than 30 wt %. The amount of resin in the binder is preferably less than 95 wt % (based upon the weight of the binder), more preferably less than 90 wt %, most preferably less than 85 wt %. The amount of resin in the binder is preferably in the range of greater than 20 wt % to less than 95 wt %, more preferably in the range of greater than 30 wt % to less than 85 wt %. The amount of oil in the binder is preferably greater than 3 wt % (based upon the weight of the binder), more preferably greater than 10 wt %. The amount of oil in the binder is preferably less than 90 wt % (based upon the weight of the binder), more preferably less than 80 wt %. The amount of oil in the binder is preferably in the range of greater than 10 wt % to less than 80 wt %. If the oil is a vegetable oil, the amount of resin in the binder is preferably in the range of greater than 60 wt % to less than 90 wt % and the amount of vegetable oil in the binder is preferably in the range of greater than 10 wt % to less than 30 wt %.

The polymer comprises functional groups chosen from carboxylic acid anhydride, carboxylic acid and epoxide groups. In one embodiment the functional groups are introduced into the polymer by a grafting process wherein monomers containing the functional group are reacted with a polymer, so that the functional groups are grafted onto the polymer. It is well known to the skilled person that functional groups can be grafted to polymers by reacting ethylenically unsaturated functional group-containing compounds with a polymer. An example of such a process, wherein carboxylic acid anhydride groups are grafted onto polyolefins, is disclosed in U.S. Pat. No. 6,380,320.

In an alternative embodiment, the functional groups may be introduced into the polymer during a co-polymerisation process wherein two or more monomer types (including at least one group of monomers containing the functional group) are polymerised. If the polymer is made by a co-polymerisation process, the monomers containing the functional groups will be part of the polymer chain.

Most preferably the polymer contains units derived from one or more of the following monomers: maleic anhydride, itaconic anhydride, dimethyl maleic anhydride, nadic anhydride, nadic methyl anhydride, tetrahydro phthalic anhydride, acrylic acid, methacrylic acid, maleic acid, fumaric acid, itaconic acid, crotonic acid, glycidyl acrylate and glycidyl methacrylate. In a preferred embodiment, the polymer contains units derived from carboxylic acid anhydride monomers, most preferably maleic anhydride monomers.

The polymer is preferably a thermoplastic elastomer or plastomer. Preferably the polymer is a functionalised olefinic polymer or copolymer such as functionalised polyethylene, polypropylene, polybutadiene or polystyrene, or functionalised ethylene vinyl acetate (EVA). More preferably the polymer is chosen from maleic anhydride grafted EVA, maleic anhydride grafted polyethylene, maleic anhydride grafted polypropylene, maleic anhydride grafted polybutadiene, maleic anhydride grafted polystyrene, ethylene/vinyl acetate/ maleic anhydride terpolymer, ethylene/acrylic acid/maleic anhydride terpolymer and ethylene/acrylic ester/glycidyl methacrylate terpolymer. Suitable polymers are available from Arkema, France, under the trade names Orevac® and Lotader®. Most preferably the polymer is maleic anhydride grafted EVA.

The degree of functionalisation of the polymer can be expressed either as acid number (the number of mg of KOH required to neutralise 1 g of polymer) or as a weight percentage, based upon the weight of the polymer, contributed by the functional groups (this can be determined, e.g., by $^{13}C$ nuclear magnetic resonance spectroscopy). The acid number of the polymer is preferably greater than 2 and less than 100, and is more preferably greater than 5 and less than 50. The weight percentage of functional groups, based upon the weight of the polymer, is preferably greater than 0.2% and less than 20%, more preferably greater than 0.5% and less than 10%.

The amount of functionalised polymer in the binder is preferably greater than 0.1 wt % (based upon the weight of the binder), more preferably greater than 1 wt % and most preferably greater than 1.5 wt %. The amount of functionalised polymer in the binder is preferably less than 20 wt % (based upon the weight of the binder), more preferably less than 10 wt % and most preferably less than 6 wt %. The amount of functionalised polymer in the binder is preferably in the range of greater than 1 wt % to less than 10 wt %, most preferably in the range of greater than 1.5 wt % to less than 6 wt %. It is preferred that the amount of functionalised polymer is within these ranges because a larger amount of polymer increases expense and could lead to poor storage stability, and because a smaller amount of polymer may provide a binder with insufficient adhesion and insufficient strength.

The binder composition may comprise polymer in addition to the functionalised polymer. The binder composition may comprise a natural or synthetic rubber, such as a copolymer of styrene and a conjugated diene (e.g. butadiene or isoprene) or a homopolymer of a conjugated diene (e.g. butadiene). The binder may comprise ethylene vinyl acetate (EVA), i.e. EVA that is not functionalised.

The binder composition may comprise further additives, e.g. softening agents such as wax or penetration index boosters such as waxes, polyphosphoric acid and ethylene polymers.

The binder composition preferably comprises a clear resin and a clear oil, and is therefore preferably clear. In one embodiment of the invention, pigments are incorporated into the binder composition so that it can be used to prepared coloured surfaces. Alternatively, the binder can be used in its clear form to prepare asphalt wherein the colour of the aggregate is visible.

The binder composition may be incorporated into an aqueous emulsion, comprising the binder composition, water and one or more additives to assist in the formation and stabilisation of the emulsion. Suitable additives are known to the skilled person and may include cationic emulsifiers such as monoamines, diamines, quaternary ammonium compounds, alkoxylated amines or amidoamines; anionic emulsifiers such as fatty acids or sulphonates; non-ionic emulsifiers such as nonylphenolethyoxylates, ethoxylated fatty acids or ethoxylized secondary alcohol bases; or clays such as natural or processed clays and bentonites. The aqueous emulsion preferably comprises from 40 to 70 wt % of the binder composition, from 60 to 30 wt % water and from 3 to 10 wt % of emulsifying agent, based upon the weight of the emulsion. The aqueous emulsion may further comprise a polymer that has been incorporated in the form of a latex (an aqueous dispersion of polymer), e.g. a latex of styrene-butadiene rubber, a latex of styrene-butadiene-styrene or a latex of polychloroprene.

Asphalts mixtures are essentially made of binder with aggregate, in particular filler, sand and stones. There are many different types of asphalts available and their characteristics can vary quite significantly. The design of asphalts for paving application is largely a matter of selecting and proportioning materials to obtain the desired properties in the finished construction. The design of the asphalt mixture is typically based on the grading of aggregates and asphalt mixtures are usually classified into dense graded, gap graded and open graded. The asphalt mixture of the invention may fall into any of these categories.

The amount of binder in the asphalt mixture of the present invention will vary depending on the application for which the asphalt is to be used. However, the asphalt mixture used in the present invention preferably comprises in the range of from 1 to 20 wt % of the binder, more preferably in the range of from 2 to 10 wt %, and most preferably in the range from 3 to 7 wt %, based on total weight of asphalt. For a mastic asphalt, the asphalt mixture preferably comprises from 10 to 15 wt % of the binder.

The present invention further provides an asphalt pavement comprising a binder composition or asphalt mixture according to the invention, and a process for preparing an asphalt pavement using a binder composition or asphalt mixture according to the invention.

The binder composition of the invention may be prepared by heating the resin, oil and functionalised polymer, e.g. to a temperature greater than 130° C., and mixing. Preferably the oil is heated, e.g. to about 160° C., the resin is added gradually whilst the temperature is maintained, e.g. at about 140° C., and then the polymer is added whilst the blend is sheared.

An aqueous emulsion of the binder composition may be prepared using techniques known to the person skilled in the art, e.g those disclosed in EP 1 184 423. Preferably the binder composition is heated so that it melts, and an emulsifying solution comprising water and emulsifying agent is added to the molten binder composition. The emulsifying solution and molten binder are mixed under high shear (e.g. in a colloid mill) to form an emulsion.

The asphalt mixture of the invention may be prepared by combining a binder composition of the invention with aggregate. In one embodiment of the invention, the asphalt mixture composition is prepared in a hot mix process wherein aggregate is heated to a temperature of at least 120° C., preferably at least 140° C. and a binder is added to the aggregate. In another embodiment of the invention, the asphalt mixture composition is prepared in a cold mix process, wherein aggregate and an aqueous emulsion of a binder are mixed at a temperature of less than 80° C., preferably at ambient temperature.

The asphalt mixture can be used to form asphalt pavement in conventional pavement-laying processes.

EXAMPLES

The invention will now be described by reference to examples which are not intended to be limiting of the invention.

Preparation of Binders

Four clear binders based upon resin and oil of vegetable origin were prepared. One comparative binder contained no polymer and another comparative binder contained conventional ethylene-vinyl acetate (Polybilt 106 from Exxon). A binder according to the invention (Example 1) contained ethylene-vinyl acetate grafted with maleic anhydride (Orevac 18211 from Arkema). Another binder according to the invention (Example 2) contained ethylene/vinyl acetate/maleic anhydride terpolymer (Orevac 9314 from Arkema).

The oil (rapeseed oil) was placed in a can. The oil was heated and the resin (pentaerythritol ester of rosin) was added gradually. The can was stored in an oven at 140° C. until the resin dissolved in the oil. The can was transferred onto a heating plate at 140-145° C. and agitated under low shear. For the polymer-containing blends, polymer was then added progressively over a few minutes. The blend was agitated until the polymer dissolved completely (this typically took more than one hour). Dissolution of the polymer was assessed visually.

The composition of the clear binders is shown in table I:

TABLE I

| | Rapeseed oil (wt %) | Rosin (pentaerythritol ester of rosin) (wt %) | Polymer (wt %) |
|---|---|---|---|
| Comparative Example 1 | 20 | 80 | 0 |
| Comparative Example 2 | 20 | 77 | 3 (conventional EVA) |
| Example 1 | 20 | 77 | 3 (maleic anhydride grafted EVA) |
| Example 2 | 20 | 77 | 3 (ethylene/vinyl acetate/maleic anhydride terpolymer) |

Adhesion Tests

Passive adhesion on four different types of stones (quartzite, flint, diorite, limestone) was measured according to the AFNOR XP T 66-043 standard. In this method, aggregates are mixed with binder (100 g stones and 5 g binder). The mix is left for 16 hours in water in an oven at 60° C. The adhesion is qualitatively assessed by observing the relative surface of stones still covered by the binder at the end of the test.

Table II shows the adhesion results (% of stones covered by binder after 16 hours in water at 60° C.) for comparative examples 1 and 2, examples 1 and 2, and also for a commercially available clear binder (comparative example 3, Mexphalte C® from Shell).

TABLE II

| | Quartzite | Flint | Diorite | Limestone |
|---|---|---|---|---|
| Comparative Example 1 | 90 | 90 | <50 | 90 |
| Comparative Example 2 | 90 | 90 | 50 | 90 |
| Example 1 | 90 | 90 | 90 | 90 |
| Example 2 | 90 | 90 | 90 | 90 |
| Comparative Example 3 | 100 | 100 | 90 | 100 |

The adhesion to quartzite, flint and limestone for the binders of the invention is similar to the adhesion for the comparative examples 1 and 2. However, the adhesion to diorite for the binders of the invention is significantly improved when compared to the adhesion for the comparative examples 1 and 2, and is similar to the adhesion achieved with the petroleum product-based commercial binder of comparative example 3.

Preparation of Binder Emulsion and Micro-Surfacing Application

A binder according to example 1 of the invention (containing 20 wt % rapeseed oil, 77 wt % pentaerythritol ester of rosin and 3 wt % of ethylene-vinyl acetate grafted with maleic anhydride) was emulsified. The emulsification was achieved using an Emulbitume colloid mill. The formulation consisted of 60 wt % of the binder, 1.6 wt % of Polyram L90 (Ceca), 0.4 wt % of Stabiram MS6 (Ceca) and a balance of water. The pH was adjusted to 2. The emulsion obtained was stable, had a dry ratio of 61.7%, a sieve residue below 1% and a Brookfield viscosity at 25° C. of 275 mPa·s.

The emulsion was tested in a micro-surfacing application. The aggregate was 0/4 white limestone from France, having a grading curve corresponding to the ISSA type III (standards from the International Slurry Seal Association). The mix was made with 11.6 wt % emulsion, 0.25 wt % Portland cement, 10 wt % water added to the aggregates and 1.5 wt % MS6 aqueous solution. Mixing time obtained was 90 seconds and Benedict cohesion after 90 min was 26 kg·min.

What is claimed is:

1. A binder composition comprising a resin of vegetable origin, an oil of vegetable origin and a polymer, wherein the amount of resin is in the range of greater than 20 wt % to less than 95 wt %, the amount of oil is in the range of greater than 10 wt % to less than 90 wt % and the amount of polymer is in the range of greater than 0.1 wt % to less than 10 wt %, wherein all weight percentages are based upon the weight of the binder composition, and wherein the polymer comprises functional groups selected from the group consisting of carboxylic acid anhydride, carboxylic acid and epoxide groups.

2. A binder composition according to claim 1, wherein the amount of resin is in the range of greater than 20 wt % to less than 85 wt %, based upon the weight of the binder composition.

3. A binder composition according to claim 1, wherein the resin is a rosin ester.

4. A binder composition according to claim 1, wherein the amount of oil is in the range of greater than 10 wt % to less than 30 wt %, based upon the weight of the binder composition.

5. A binder composition according to claim 1, wherein the oil is rapeseed oil, palm oil or tall oil.

6. A binder composition according to claim 1, wherein the polymer is a thermoplastic elastomer or plastomer and the amount of polymer is in the range of greater than 1 wt % to less than 10 wt %.

7. A binder composition according to claim 6, wherein the functional groups are selected from the group consisting of functional groups derived from one or more of maleic anhydride, itaconic anhydride, dimethyl maleic anhydride, nadic anhydride, nadic methyl anhydride, tetrahydro phthalic anhydride, acrylic acid, methacrylic acid, maleic acid, fumaric acid, itaconic acid, crotonic acid, glycidyl acrylate and glycidyl methacrylate.

8. A binder composition according to claim 7, wherein the functional groups are derived from maleic anhydride.

9. An aqueous emulsion comprising a binder composition according to claim 1, water and one or more additives to assist in the formation and stabilisation of the emulsion.

10. A mixture comprising a binder composition according to claim 1 and aggregate.

11. A binder composition according to claim 1, wherein the amount of resin is in the range of greater than 60 wt % to less than 90 wt %, based upon the weight of the binder composition.

12. A pavement comprising a binder composition according to claim 1 and aggregate.

* * * * *